No. 817,602. PATENTED APR. 10, 1906.
W. S. WHITMORE.
WATER HEATING APPARATUS.
APPLICATION FILED MAY 29, 1905.
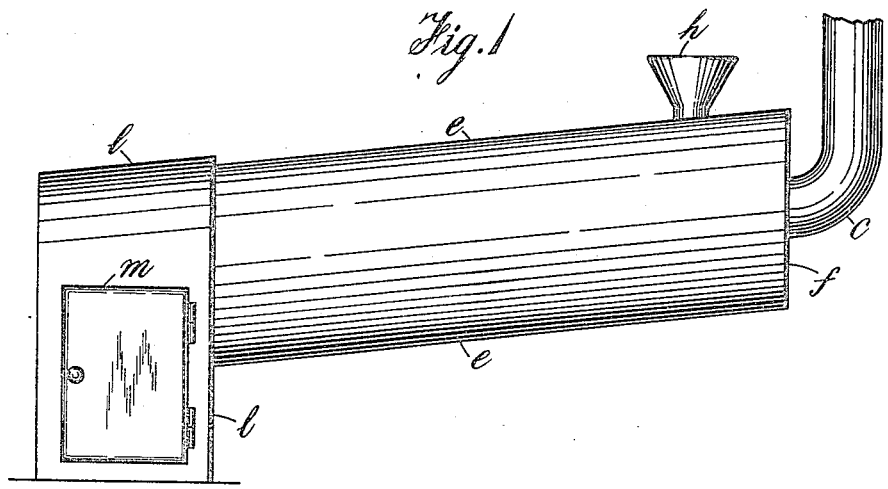
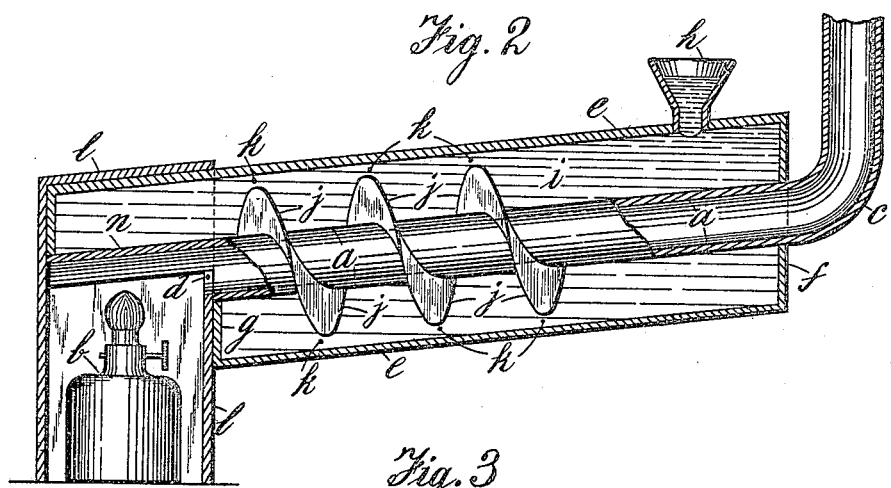

UNITED STATES PATENT OFFICE.

WILLIAM SYRE WHITMORE, OF CRICKLEWOOD, ENGLAND.

WATER-HEATING APPARATUS.

No. 817,602.  Specification of Letters Patent.  Patented April 10, 1906.

Application filed May 29, 1905. Serial No. 262,895.

*To all whom it may concern:*

Be it known that I, WILLIAM SYRE WHITMORE, a subject of the King of Great Britain, residing at 34 Gratton Terrace, Cricklewood, in the county of Middlesex, England, have invented a new and useful Improvement in Water-Heating Apparatus, of which the following is a specification.

My invention is an improvement in water-heating apparatus; and the objects of my improvement are, first, to make the entire apparatus very simple, cheap, and effective, and, second, to reduce the consumption of the fuel required for heating. I attain these objects by the means illustrated in the accompanying drawings, in which—

Figure 1 is a side view of the entire apparatus; Fig. 2, a longitudinal section through Fig. 1, and Fig. 3 a back view of the heating-chamber with the remainder of the apparatus removed.

Similar letters of reference refer to similar parts throughout the several views.

$a$ is an inner nearly horizontal pipe, of zinc or other sheet metal, so arranged that at one end, which is lower than the other end, the flame and heat of an oil-lamp $b$ or other heating contrivance can enter and pass completely through its entire length, whence they are conducted away by means of a pipe $c$ to a chimney. Surrounding this inner pipe, except at the part where the heat enters the latter at $d$, is fixed a second pipe $e$ of larger diameter, the ends of which are stopped at $f$ and $g$, and this outer pipe is fitted with an opening at $h$, by which it can be filled with water. In the space $i$ between the inner and outer pipes described and for a considerable part of their length I fit and fix a helical endless band or screw $j$, of thin metal, the effect of which is to cause the water to rapidly circulate in the space between the two pipes when the heat is applied in the manner described. This helical screw does not completely fill the space between the inner and outer pipes, but a sufficient space $k$ is left between the inner side of the outer pipe $e$ and the edge of the helical band $j$ for the circulation of the water, which is promoted by the whole apparatus being slightly raised at the end farthest from the heating-lamp, as shown.

$l$ is a chamber surrounding the lamp or other heating device $b$, and the upper part of the inner pipe $a$ is prolonged at $n$ into this chamber $l$ above the heater, as shown at $m'$, and affords additional heating-surface.

$m$ is a hinged door at the side of the chamber $l$ for facilitating the adjusting of the flame.

Heating apparatus constructed according to my invention is extremely effective in operation, the water being heated very rapidly and at little cost for fuel. An oil-lamp, an ordinary gas-burner, or other suitable device may be used for obtaining the necessary heat.

The details of the apparatus may be varied according to the size and character of the place to be heated.

Having fully described my invention, what I desire to claim and secure by Letters Patent is—

1. In a water-heating apparatus, the combination of an inner inclined pipe with an outer inclined pipe, closed at its ends, a helical endless band upon the inner pipe leaving a space between the inside of the outer pipe and the outer edge of the helical band, a discharge-pipe leading from the upper end of the inner pipe, a chamber communicating with the lower end of the inner pipe, and a heating device located in said chamber adjacent one end of said pipes, substantially as described.

2. In a water-heating apparatus, the combination of an apertured casing forming a chamber for receiving a heating device, and a water-pipe having a part of one end cut away, said end being adapted to fit snugly within said casing, substantially as described.

In witness whereof I have hereunto set my hand in the presence of two witnesses.

WILLIAM SYRE WHITMORE.

Witnesses:
ARTHUR E. EDWARDS.
ALFRED G. BRATTON.